C. B. FORBES.
HANDLE.
APPLICATION FILED MAR. 31, 1917.
1,230,472.
Patented June 19, 1917.
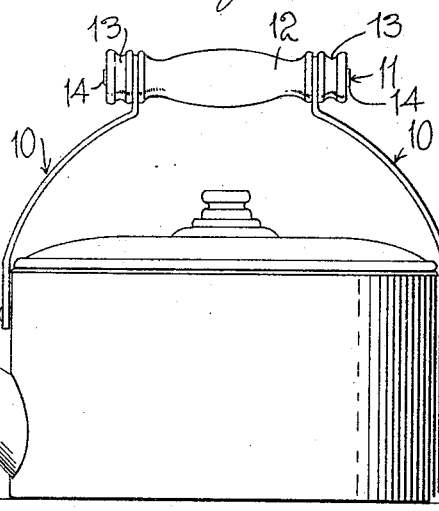
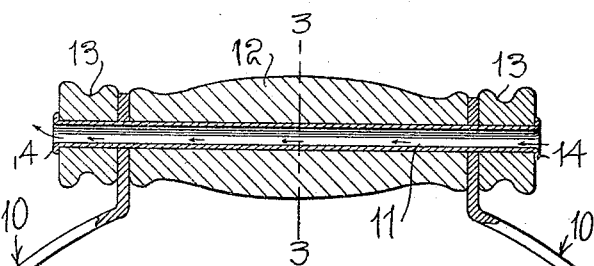
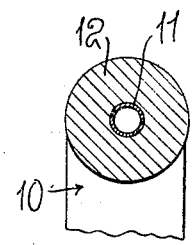
Inventor,
C. B. Forbes
By Watson E. Coleman
Attorney

UNITED STATES PATENT OFFICE.

CORNELIUS B. FORBES, OF GUILFORD, CONNECTICUT.

HANDLE.

1,230,472.  Specification of Letters Patent.  Patented June 19, 1917.

Application filed March 31, 1917. Serial No. 158,924.

*To all whom it may concern:*

Be it known that I, CORNELIUS B. FORBES, a citizen of the United States, residing at Guilford, in the county of New Haven and State of Connecticut, have invented certain new and useful Improvements in Handles, of which the following is a specification, reference being had to the accompanying drawings.

This invention relates to handles, and particularly to cold or non-heat conducting handles.

The general object of my invention is to provide a handle for pokers, stove lid lifters, coffee pots, tea pots, wash boilers, culinary utensils, and other purposes, which is so constructed that it will always remain cool, and particularly which is constructed to provide an air passage, preferably extending entirely through the handle whereby the heat of the handle may be rapidly dissipated.

While I design to apply the principle of my invention to handles of many different forms and for many different purposes, yet I have only illustrated the handle in its general form, without illustrating its application to the various purposes above referred to.

My invention is illustrated in the accompanying drawings, wherein:—

Figure 1 is a side elevation of a kettle with my handle applied thereto;

Fig. 2 is a longitudinal sectional view of the handle;

Fig. 3 is a section on the line 3—3 of Fig. 2.

Referring to these figures, 10 designates supporting brackets, which may project from a coffee pot, tea pot, wash boiler, or other article of like nature, these brackets being apertured for the passage of a tube 11. Surrounding the tube 11, between the brackets, is a sleeve 12, which may be made of wood, hard fiber, or other suitable material, and have any ornamental form. As illustrated, the tube 11 extends out some distance beyond the brackets 10 and disposed on the ends of the tube are the knobs 13, which are intended to give an ornamental character to the handle and to hold the outwardly projecting ends of the bracket firmly between the knobs and the sleeve 12. Preferably the extremities of the tube 11 are overturned as at 14, so as to hold the knobs in place and prevent any longitudinal movement of the parts. It will be noted that the ears 10 or brackets come into heat conductive contact with the metallic tube 11 so that the heat from these brackets will be conducted away by the tube, the tube being cooled by the passage of air therethrough. It will be seen that my invention may be applied as a handle to a large number of different objects.

Having described my invention, what I claim is:—

The combination with an article having metallic ears, of a handle comprising a tubular metallic member open at its ends and passing through said ears and in contact therewith, a sleeve surrounding the tubular member disposed between said ears, the sleeve being of non-heat conducting material, and knobs surrounding the extremities of the tubular member and formed of non-heat conducting material, the ends of the tubular member being overturned to hold the knobs in place against the ears.

In testimony whereof I hereunto affix my signature in the presence of two witnesses.

CORNELIUS B. FORBES.

Witnesses:
 A. R. GRISWOLD,
 CHAS. GRISWOLD.

Copies of this patent may be obtained for five cents each, by addressing the "Commissioner of Patents, Washington, D. C."